United States Patent
Hanada et al.

(10) Patent No.: US 6,904,342 B2
(45) Date of Patent: Jun. 7, 2005

(54) CONTROL APPARATUS FOR ENERGY STORAGE DEVICE IN MOTOR VEHICLE

(75) Inventors: Hideto Hanada, Yokohama (JP); Hiroshi Tsujii, Mishima (JP); Takashi Kawai, Susono (JP); Masanori Sugiura, Toyota (JP); Ken Kuretake, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/338,010

(22) Filed: Jan. 8, 2003

(65) Prior Publication Data

US 2003/0139859 A1 Jul. 24, 2003

(30) Foreign Application Priority Data

Jan. 23, 2002 (JP) ........................................ 2002-014684

(51) Int. Cl.[7] .............................. G06F 7/00; G05D 1/00
(52) U.S. Cl. ......................... 701/22; 320/104; 320/144; 320/150; 290/36 R
(58) Field of Search ................................ 320/127–128, 320/137–138, 144, 130–135, 150–153, 147, 104, 103, 157, 155, 164–166; 318/806, 783, 805, 803; 290/31, 50, 38 R; 307/66, 10.1, 10.6; 701/22; 123/179.3, 179.21; 322/14, 28, 33, 99

(56) References Cited

U.S. PATENT DOCUMENTS

| 4,659,977 | A | * | 4/1987 | Kissel et al. ................. 320/150 |
| 5,157,320 | A | * | 10/1992 | Kuriloff ....................... 320/151 |
| 5,339,018 | A | * | 8/1994 | Brokaw ........................ 320/147 |
| 5,430,363 | A | * | 7/1995 | Kim ............................. 320/128 |
| 5,623,197 | A | * | 4/1997 | Roseman et al. ............ 320/134 |
| 5,710,507 | A | * | 1/1998 | Rosenbluth et al. .......... 307/66 |
| 5,872,453 | A | * | 2/1999 | Shimoyama et al. ........ 324/431 |
| 5,978,719 | A | * | 11/1999 | Yano et al. .................... 701/22 |
| 6,150,793 | A | * | 11/2000 | Lesesky et al. .............. 320/104 |
| 6,202,615 | B1 | * | 3/2001 | Pels et al. ................. 123/179.3 |
| 6,232,748 | B1 | * | 5/2001 | Kinoshita .................... 320/132 |
| 6,252,377 | B1 |   | 6/2001 | Shibutani et al. ............ 320/132 |
| 6,363,315 | B1 | * | 3/2002 | Love et al. .................. 701/104 |
| 6,481,406 | B2 |   | 11/2002 | Pels ......................... 123/179.3 |
| 6,563,288 | B2 | * | 5/2003 | Ueno et al. .................. 318/783 |
| 6,630,810 | B2 | * | 10/2003 | Takemasa et al. ........... 320/104 |
| 6,647,939 | B2 | * | 11/2003 | Manabe et al. ........... 123/179.3 |
| 2002/0140405 | A1 | * | 10/2002 | Malik ........................... 320/166 |

FOREIGN PATENT DOCUMENTS

| DE | 198 40 819 A1 | 8/2000 |
| DE | 100 02 848 A1 | 1/2001 |
| DE | 199 47 922 A1 | 4/2001 |
| EP | 0 391 065 A2 | 3/1990 |
| JP | A 2000-156919 | 6/2000 |
| JP | A 2001-268719 | 9/2001 |
| JP | 2001300740 A | 10/2001 |

* cited by examiner

Primary Examiner—Jacques H. Louis-Jacques
(74) Attorney, Agent, or Firm—Oliff & Berridge, PLC

(57) ABSTRACT

A control apparatus for use in a vehicle for controlling an energy storage device adapted to discharge electric power that varies with a temperature is provided. The control apparatus includes a temperature sensor that measures a temperature associated with the energy storage device, and a voltage control unit that sets a minimum storage voltage of the energy storage device to a relatively high voltage level when the temperature measured by the temperature sensor is lower than a predetermined temperature, as compared with a voltage level to which the minimum storage voltage is set when the temperature is higher than the predetermined temperature.

27 Claims, 5 Drawing Sheets

CONTROL APPARATUS FOR ENERGY STORAGE DEVICE IN MOTOR VEHICLE

INCORPORATION BY REFERENCE

The disclosure of Japanese Patent Application No. 2002-014684 filed on Jan. 23, 2002, including the specification, drawings and abstract, is incorporated herein by reference in its entirety.

BACKGROUND OF THE INVENTION

1. Field of the Invention

The invention relates to apparatus and method for controlling an energy storage device installed on a motor vehicle.

2. Description of Related Art

An electrical energy storage device is provided as a power source for supplying electric power to various electrical devices installed on the vehicle. Conventionally, the energy storage device was charged with electric power supplied from a generator driven by an internal combustion engine serving as a driving power source of the vehicle. However, in order to meet with an increasing demand for improvement of the fuel economy and reduction of exhaust emissions in recent years, it has been proposed to charge the energy storage device with electric power regeneratively obtained by converting kinetic energy of the vehicle into electrical energy.

A typical example of the above type of vehicle is a hybrid vehicle provided with an internal combustion engine and a motor/generator as driving power sources. This type of vehicle may be started by the motor/generator, and the motor/generator is therefore required to generate a large quantity of energy in a moment. To meet with this requirement, a capacitor capable of storing electric power in the form of static electricity is used as a power source of the motor generator and also as an energy storage device for storing regenerative power generated by the motor/generator. The capacitor, which provides a comparatively high voltage, is normally used along with a battery, such as a conventional lead-acid battery, serving as a power source of accessories.

Furthermore, a so-called eco-run (abbreviation of economy running) vehicle capable of economy running control has been recently developed for the purpose of improvement of the fuel economy. The eco-run vehicle is arranged to stop idling of the engine under certain engine stop conditions when the vehicle is temporarily stopped, and restart the engine by automatically cranking the engine at a point of time when any of the engine stop conditions ceases to be established. With this arrangement, the idle time with respect to the whole vehicle operation time is reduced, and the amount of discharge of exhaust gas is accordingly reduced, while at the same time assuring improved fuel economy. In this type of eco-run vehicle, the engine needs to be quickly restarted, and therefore a capacitor capable of discharging a large quantity of electric power in a moment may be employed as a power source of a starter for starting or restarting the engine, in place of a conventional battery.

A generally known capacitor is able to provide a relatively high storage voltage and discharge a large quantity of electric power within a short time, but, on the other hand, suffers from a large loss due to self-discharge. In view of these characteristics, a part of electric power stored the capacitor is supplied to a battery to thus charge the battery, so that the quantity of the electric power stored in the capacitor and its voltage are reduced, thereby to reduce the loss due to self-discharge to the minimum. An example of this control is described in Japanese Laid-open Publication No. 2000-156919. With this control, the engine is less likely to be required to drive an alternator to charge the battery, and therefore consumption of fuel for driving the alternator is reduced, resulting in improved fuel economy.

When the electric arrangement of the vehicle is constructed such that the battery is charged by the capacitor, as described in the above-identified publication, the capacitor serves as a power source for charging the battery, and also serves as a power source of a starter for cranking the internal combustion engine. Accordingly, even if the capacitor discharges electric power to the battery, the voltage of the capacitor needs to be maintained at a sufficiently high voltage level which allows the engine to be started (i.e., cranked) by the starter, or which allows the vehicle to be started by using a motor/generator as a driving power source.

In the meantime, the conventional capacitor has a temperature characteristic that the internal resistance increases and the capacitance decreases as the temperature associated with the capacitor decreases from a certain level. If the capacitor has a low temperature at the time when the capacitor needs to discharge electric power to the starter or motor/generator, therefore, sufficient electric power may not be supplied from the capacitor to the starter or motor/generator. In eco-run vehicles, for example, the internal combustion engine may not be sufficiently rotated or cranked by the starter, which make it more likely that the engine is started with a delay or the engine fails to be re-started. In hybrid vehicles, the vehicle starting and accelerating capability is apt to be deteriorated, or the vehicle may fail to be started.

In the above case, the internal combustion engine may be started by using the battery. However, since electric power that can be discharged from the battery per unit time is smaller than electric power discharged from the capacitor in its normal state, the engine is not necessarily started quickly as desired. Thus, the use of the battery is likely to result in an increased delay in the start of the engine.

SUMMARY OF THE INVENTION

It is therefore an object of the invention to provide control apparatus and method which enable an energy storage device to discharge a sufficiently large quantity of electric power even in the case where the energy storage device has a low temperature.

To accomplish the object, there is provided according to one aspect of the invention a control apparatus for use in a vehicle for controlling an energy storage device adapted to discharge electric power that varies with a temperature, which apparatus includes (a) a temperature sensor that measures a temperature associated with the energy storage device, and (b) a voltage control unit that sets a minimum storage voltage of the energy storage device to a first voltage level when the temperature measured by the temperature sensor is lower than a predetermined temperature, the first voltage level being higher than a second voltage level to which the minimum storage voltage is set when the temperature is higher than the predetermined temperature.

In the control apparatus as described above, the minimum storage voltage of the energy storage device is maintained at a relatively high voltage level when the temperature associated with the energy storage device is relatively low, as compared with the case where the temperature is relatively high. Consequently, a sufficiently large quantity of electric power can be taken out of or output from the energy storage device in a low-temperature condition. When the internal combustion engine is started using the energy storage device as a power source, the engine is started with high reliability without a delay even at a lower temperature. In the case of a hybrid vehicle, the vehicle starting and accelerating capabilities can be improved.

In one embodiment of the invention, the vehicle includes an electrical device adapted to be driven with electric power supplied from the energy storage device, and the voltage control unit sets the minimum storage voltage of the energy storage device to the first voltage level higher than the second voltage level, when the temperature measured before the electrical device is actuated is lower than the predetermined temperature.

With the arrangement as described above, since the minimum storage voltage of the energy storage device is increased with a reduction in the temperature, sufficiently large current can be supplied to the electrical device even in a situation where the internal resistance of the energy storage device is increased at a low temperature. Consequently, shortage of the output torque of the electrical device can be avoided or suppressed.

In another embodiment of the invention, the electrical device consists of a starter motor adapted to rotate an internal combustion engine installed on the vehicle.

In this case, sufficiently large electric current is supplied from the energy storage device to the starter motor even at a relatively low temperature, so that the internal combustion engine can be surely rotated by the starter motor. Thus, a delay in the start of the internal combustion engine or a failure to start the engine can be suppressed or avoided in advance.

In a further embodiment of the invention, the vehicle further includes another energy storage device adapted to be charged when selectively receiving electric power from the energy storage device.

With the above arrangement, another energy storage device can be charged with electric power supplied from the energy storage device. In this case, too, the minimum storage voltage of the energy storage device is maintained at a relatively high voltage level when the temperature is relatively low, and therefore a loss of electric power due to self-discharge of the energy storage device can be reduced. Furthermore, sufficiently large electric power can be taken out of the energy storage device even at a low temperature.

In a still further embodiment of the invention, the energy storage device is operable to store electric power in the form of static electricity, and the above-indicated another energy storage device is operable to store electric power in the form of chemical energy, and the minimum storage voltage of the energy storage device is higher than a storage voltage of said another energy storage device.

With the arrangement as described above, another energy storage device can be charged with electric power supplied from the energy storage device. In this case, too, the minimum storage voltage of the energy storage device is maintained at a relatively high voltage level when the temperature is relatively low, and therefore a loss of electric power due to self-discharge of the energy storage device can be reduced. Furthermore, sufficiently large electric power can be taken out of the energy storage device even at a low temperature.

In another embodiment of the invention, the vehicle further includes a regenerating unit that recovers electric power by converting kinetic energy of the vehicle into electric energy, and charges the energy storage device with the recovered electric power.

With the above arrangement, electric power obtained by converting kinetic energy into electrical energy can be stored in the energy storage device, and the minimum storage voltage of the energy storage device is set to a relatively high level when the temperature is relatively low. Thus, a loss of the regenerative energy due to self-discharge of the energy storage device can be reduced, and the energy can be highly effectively utilized.

BRIEF DESCRIPTION OF THE DRAWINGS

The foregoing and/or further objects, features and advantages of the invention will become more apparent from the following description of an exemplary embodiment with reference to the accompanying drawings, in which like numerals are used to represent like elements and wherein.

DETAILED DESCRIPTION OF THE EXEMPLARY EMBODIMENT

Figure 4:
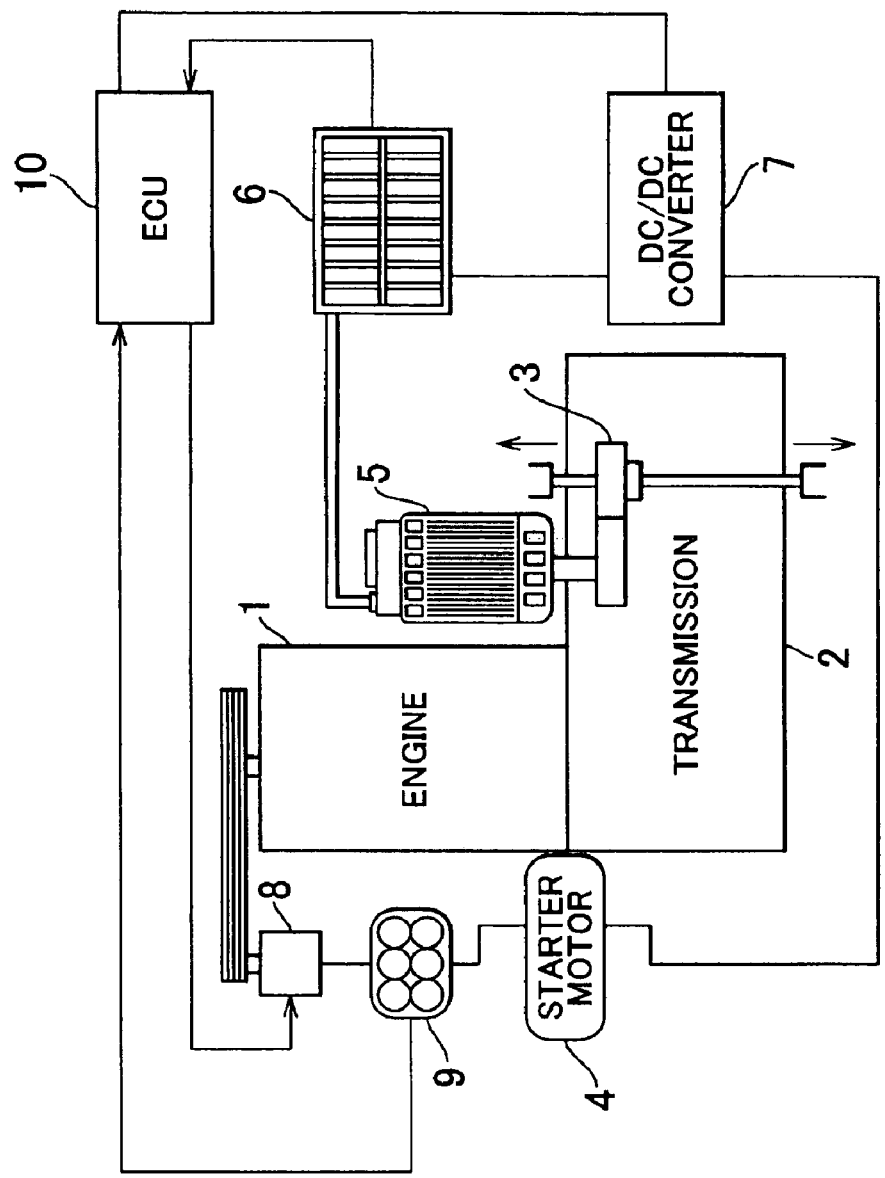
FIG. 4 is a view schematically showing a system and its control system associated with storage and discharge of electric power in a vehicle in which the control apparatus according to one embodiment of the invention is employed.

An exemplary embodiment of the invention will be described in detail with reference to the accompanying drawings. Initially, the construction of a vehicle in which the control apparatus of this embodiment is employed will be described. Referring to FIG. 4, a transmission 2 is coupled to an output shaft of an internal combustion engine (hereinafter simply referred to as "engine") 1, and torque is transmitted from the engine 1 to right and left drive wheels (not shown) via the transmission 2 and a differential gear unit 3 connected to the transmission 2.

The engine 1 is a power unit, such as a gasoline engine, diesel engine or a natural gas engine, which is adapted to generate torque by burning a fuel, such as gasoline, light oil, or natural gas. The engine 1 is equipped with a starter motor 4 adapted for cranking the engine 1 upon a start of the engine 1. The starter motor 4 is arranged to operate with, for example, a 12-volt dc power source and a higher-volt (i.e., higher than 12V) power source, so as to crank the engine 1 by generating torque depending upon an electric power supplied thereto.

The transmission 2 may be suitably selected from a manual or automatic transmission having a plurality of gear stages or positions, a continuously variable transmission, and other types of transmission, and is arranged to transmit driving power from its output member to the differential gear unit 3. The transmission 2 can be set in a neutral state in which a power transmitting system from the engine 1 to the differential gear set 3 is disconnected or cut off. A generator 5 is coupled to a rotary member of the transmission 2 that can transmit or receive torque to or from the drive wheels even when the transmission 2 is in the neutral state.

The generator 5 is arranged to be rotated by external force so as to generate electric power. More specifically, the generator 5 is able to generate electric power by receiving a part of driving power from the engine 1 while the vehicle is running with the power generated by the engine 1, and is also able to recover or regenerate a part of kinetic energy of the vehicle in the form of electric power while the vehicle is running with its inertial force. The alternating current generated by the generator 5 is converted to direct current by an inverter, so that the direct current is used for charging a capacitor 6.

Figure 5:
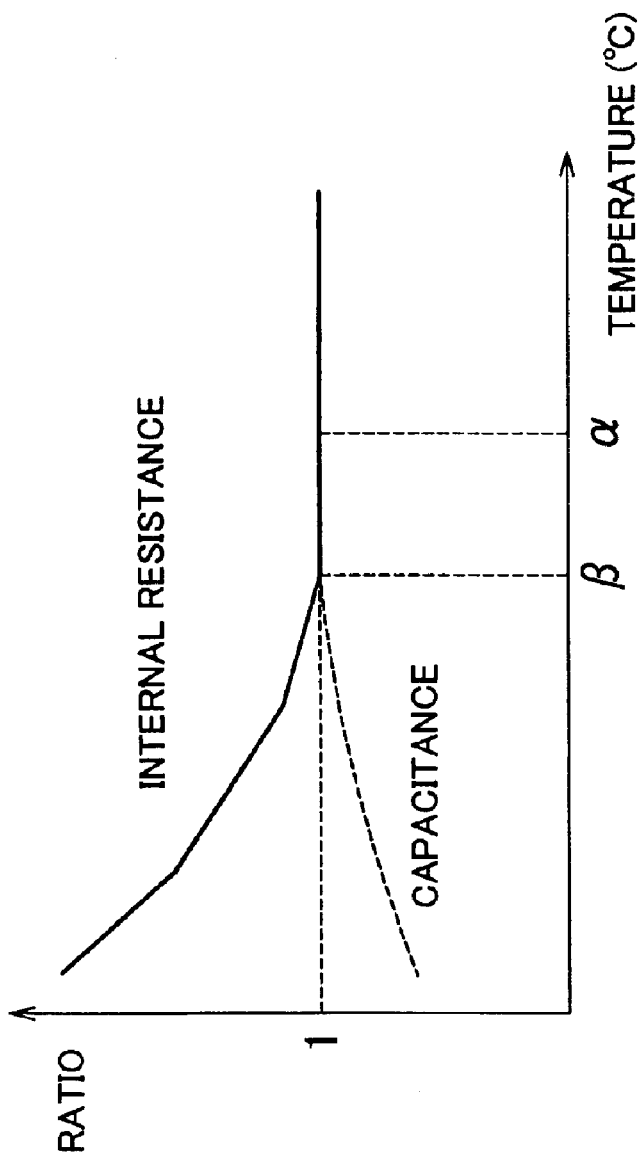
FIG. 5 is a view showing one example of a temperature characteristic of the capacitor.

The capacitor 6 is one type of energy storage device adapted to store electric power in the form of static electricity, and is able to quickly store and discharge a large quantity of electric power as compared with conventional energy storage means, such as a lead-acid battery. The capacitor 6 is arranged to store electric power at a suitable voltage in a range of, for example, 0 V to 40 V The capacitor 6 has a characteristic that the electric power that can be generated by the capacitor 6 is inevitably reduced as the temperature of the capacitor 6 decreases. As is understood from FIG. 5 showing one example of this characteristic, where the internal resistance and capacitance at a predetermined temperature $\alpha°$ C. around room temperature are taken as "1", the internal resistance increases from 1 and the capacitance decreases from 1 as the temperature is reduced from a predetermined temperature $\beta°$ C. which is lower than the above temperature $\alpha°$ C.

The capacitor 6 and the starter motor 4 are electrically connected to each other via a DC/DC converter 7. By supplying electric power from the capacitor 6 to the starter motor 4, the starter motor 4 operates to start the engine 1, using the capacitor 6 as a power source.

Like conventional vehicles, the vehicle as shown in FIG. 4 is provided with an alternator 8 adapted to be driven by the engine 1 to generate electric power. The electric power generated by the alternator 8 is supplied to a battery 9, such as a lead-acid battery, so as to charge the battery 9. The battery 9 stores the electric power in the form of chemical energy. The charging voltage of the battery 9 is, for example, 12 V, which is lower than the storage voltage of the capacitor 6. In operation, electric power is supplied from the battery 9 to the starter motor 4, so that the starter motor 4 can start the engine 1 by using the battery 9 as a power source.

In addition, the battery 9 is adapted to receive electric power from the capacitor 6 via the DC/DC converter 7 so that the battery 9 can be charged with a part of the electric power stored in the capacitor 6. In the vehicle of FIG. 4, an electronic control unit (ECU) 10 is provided for monitoring or controlling the state of charge (SOC) of the capacitor 6 and the battery 9 and the quantity of electric power supplied from the capacitor 6 to the battery 9. The electronic control unit 10 includes a microcomputer as a main component, and receives data for use in control, including a storage voltage and SOC of the capacitor 6, SOC of the battery 9, ambient temperature or coolant temperature of the engine or temperature of the capacitor 6, and so forth. The electronic control unit 10 is also arranged to output control command signals, for example, signals for controlling the DC/DC converter 7 and the alternator 8 and signals for controlling the generator 5 and the inverter (not shown).

The control apparatus of this embodiment controls energy storage devices (i.e., capacitor 6 and battery 9) of the vehicle as described above, such that the capacitor 6 is charged with energy recovered or regenerated by the generator 5, for improvement of the fuel economy, and such that electric power is supplied from the capacitor 6 to the battery 9 so as to charge the battery 9, whereby the quantity of self-discharge of the capacitor 6 can be reduced, and the quantity of electric power generated by the alternator 8 for charging the battery 9 can be reduced for improvement of the fuel economy. As described above, since the capacitor 6 also functions as a power source of the starter motor 4, sufficient electric power for driving the starter motor 4 should remain in the capacitor 6 even if some electric power is supplied from the capacitor 6 to the battery 9. To this end, the minimum storage voltage of the capacitor 6 is controlled to a suitable voltage level depending upon the temperature, in view of the temperature characteristic of the capacitor 6 as shown in FIG. 5 by way of example.

Figure 1:
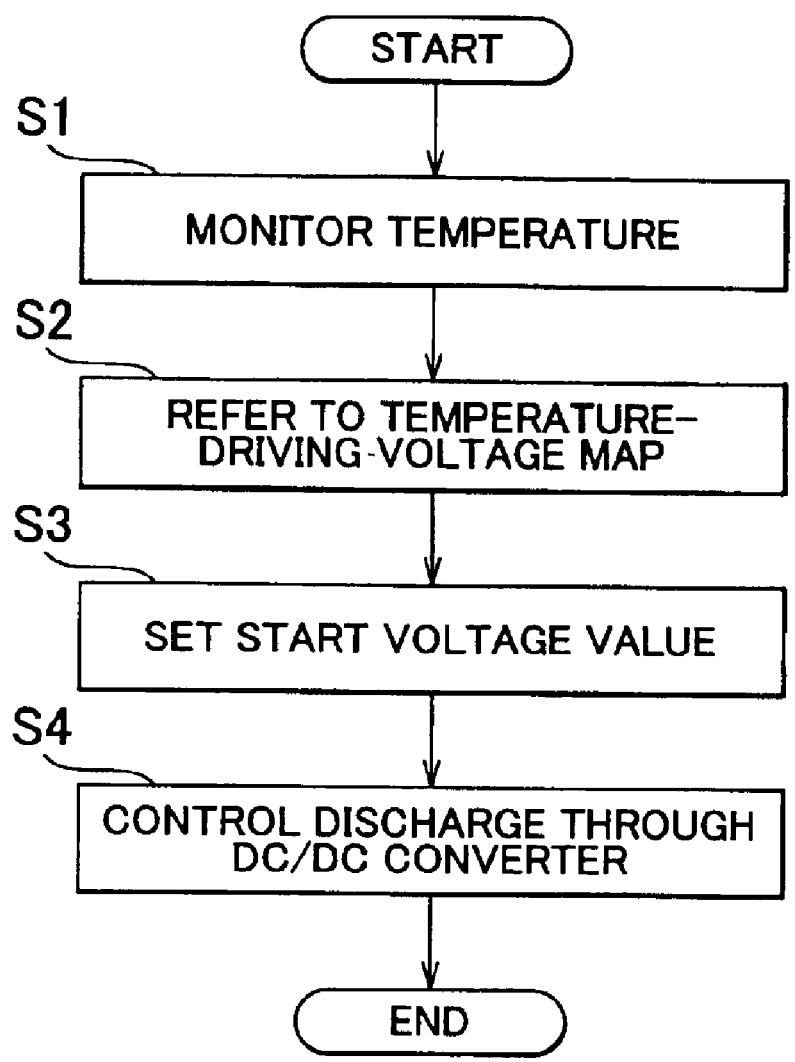
FIG. 1 is a flowchart useful for explaining an example of a control routine executed by a control apparatus according to one embodiment of the invention.

FIG. 1 is a flowchart used for explaining an example of control performed by the control apparatus of the present embodiment. Initially, step S1 is executed to monitor the temperature associated with the capacitor 6. This step may be implemented by measuring an ambient temperature with a temperature sensor (not shown) of an air conditioner (not shown) installed on the vehicle, or directly measuring the temperature of the capacitor 6 with a suitable sensor, or correcting the thus measured temperature as needed. In an operating state in which the engine 1 has not been warmed up, and the engine coolant temperature changes in relation to the ambient temperature, step S1 may be implemented by measuring the coolant temperature.

Figure 2:
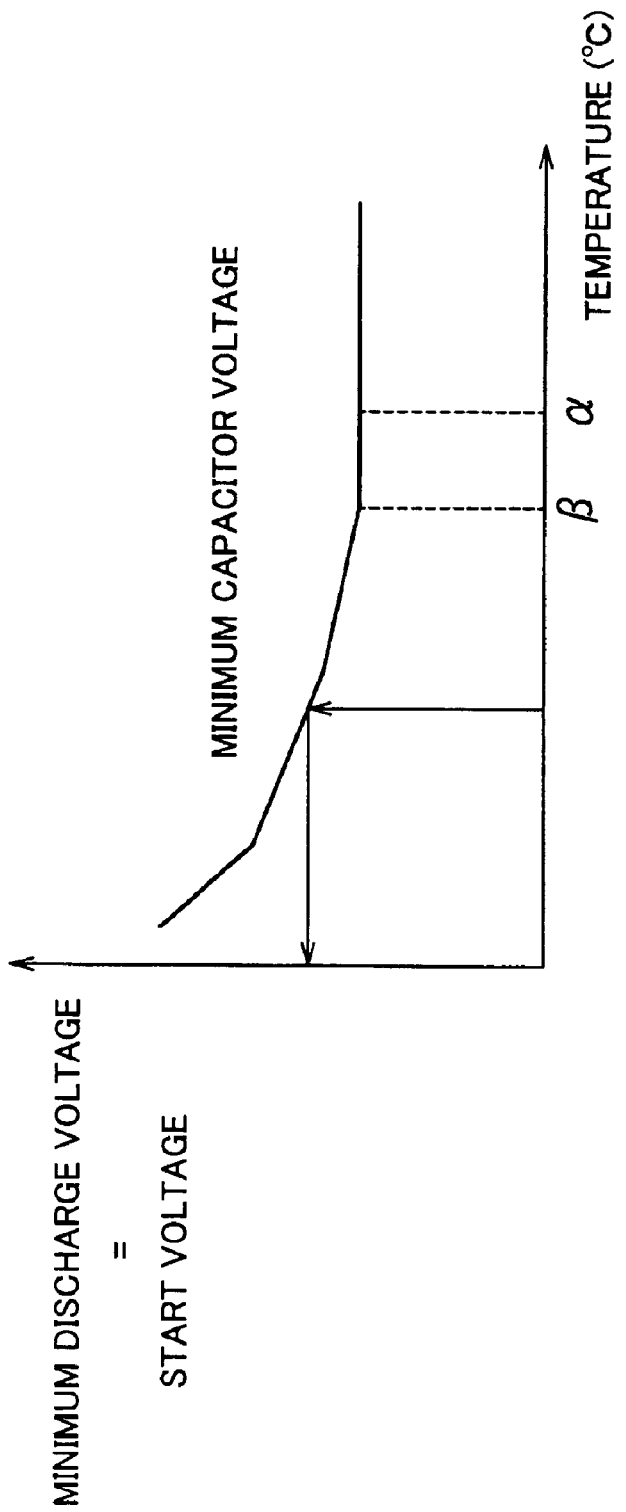
FIG. 2 is a view showing one example of a temperature-driving voltage map used in the control routine of FIG. 1.

Step S2 is then executed to refer to a map representing a relationship between the temperature and the driving voltage to be applied to the starter motor 4 upon a start of the engine 1. The temperature-driving voltage map defines the minimum storage voltage of the capacitor 6 which allows the capacitor 6 to supply electric current to the starter motor 4 even in a low-temperature condition, which electric current would be similarly supplied to the starter motor 4 at the predetermined temperature $\alpha°$ C. or higher. This map is plotted in view of the temperature characteristic of the capacitor 6 that the electric power to be discharged is likely to be reduced with a reduction in the temperature, as described above. One example of the temperature-driving voltage map is shown in FIG. 2. In this map, the minimum storage voltage of the capacitor 6 is set to be increased as the temperature decreases from the predetermined temperature $\beta°$ C. at which the electric power to be discharged starts being reduced. According to the map of FIG. 2, when the temperature is relatively low, the minimum discharge voltage, i.e., the initial start voltage applied to the starter motor 4, is set to be relatively high.

Figure 3:
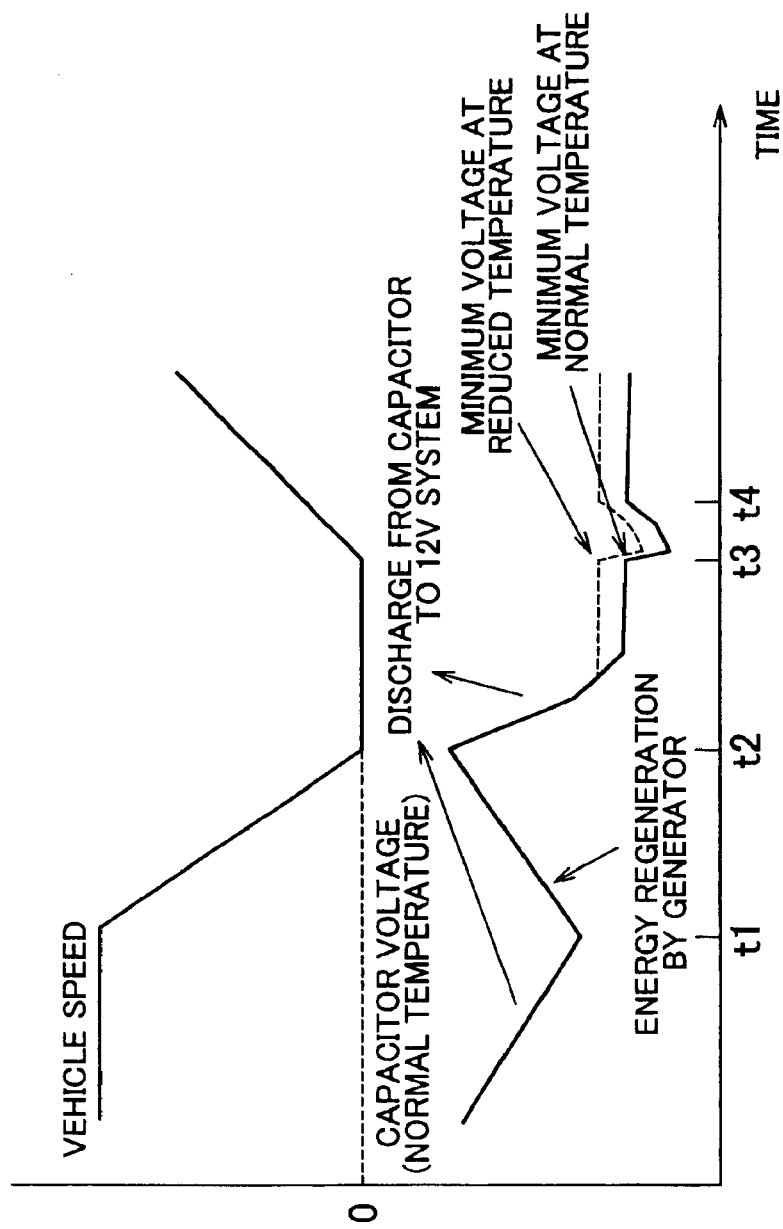
FIG. 3 is a time chart showing changes in voltage of a capacitor at a normal temperature and at a reduced temperature when the control of FIG. 1 is performed.

Referring to the map of FIG. 2, for example, the start voltage level to be applied to the starter motor 4 is set in accordance with the detected temperature in step S3. To maintain the start voltage, in other words, to maintain the minimum storage voltage of the capacitor 6, discharge from the capacitor 6 is controlled by the DC/DC converter 7 in step S4. One example of the discharge control is illustrated in FIG. 3, which shows changes in the voltage of the capacitor 6 with time.

When the vehicle is running at a constant speed, the engine 1 generates driving power while regeneration or recovery of energy by the generator 5 is not performed. In this case, electric power is discharged from the capacitor 6 so that the voltage of the capacitor 6 is maintained at the minimum storage voltage. More specifically, electric power is supplied from the capacitor 6 to the battery 9, or is discharged to accessories, such as 12-volt electrical devices, to which electric power is normally supplied from the battery 9. In this condition, therefore, power generation by the alternator 8 is stopped, resulting in improved fuel economy or reduced fuel consumption. Also, the voltage of the capacitor 6 is gradually lowered.

Once the vehicle starts being decelerated (at a point of time "t1" in FIG. 3), the generator 5 is driven so as to recover energy (i.e., convert kinetic energy into electrical energy). In this case, the capacitor 6 is charged with electric power generated by the generator 5, and therefore the voltage of the capacitor 6 is gradually increased, The recovery or regeneration of energy is continued up to a point of time "t2" at which the vehicle is stopped.

If the voltage of the capacitor 6 at the point of time when the vehicle is stopped (i.e., when the vehicle speed is equal to zero) is higher than the minimum storage voltage determined from the map as shown in FIG. 2, electric power is discharged from the capacitor to 12-volt devices, such as the battery 9. As a result, the voltage of the capacitor 6 is lowered. The discharge continues until the voltage of the capacitor 6 is reduced down to the minimum storage voltage determined based on the map of FIG. 2. The minimum storage voltage is set to a relatively high voltage level as denoted by the broken line in FIG. 3 when the temperature is relatively low, as compared with a voltage level as denoted by the solid line in FIG. 3 which is established when the temperature is relatively high.

In the case where the vehicle is a so-called eco-run (abbreviation of economy running) vehicle, the engine 1 is automatically stopped under certain conditions after the vehicle is stopped, and is subsequently restarted (at a point of time t3 in FIG. 3) when a request for start is generated, for example, when a braking action is cancelled, and/or an accelerator pedal (not shown) is stepped down. The restart of the engine 1 is basically implemented by driving the starter motor 4 by using the capacitor 6 as a power source so as to cause the starter motor 4 to crank the engine 1.

If the temperature associated with the capacitor 6 is relatively low at this point of time (t3), the voltage of the capacitor 6 is set to be relatively high in accordance with the temperature. Accordingly, even if the discharge characteristic of the capacitor 6 itself is deteriorated because of the low temperature, sufficient electric power is supplied from the capacitor 6 to the starter motor 4. As a result, the engine 1 is started without any noticeable delay, and, in the example of FIG. 3, the vehicle is immediately started and accelerated in the same manner as when the vehicle is started in a normal-temperature condition.

As shown in FIG. 3, the discharge of electric power from the capacitor 6 continues up to a point of time t4 at which the start of the engine 1 is completed. During the period between t3 and t4, the voltage of the capacitor 6 is lowered. After the start of the engine 1 is completed, the vehicle runs with power generated by the engine 1, and the capacitor 6 does not perform any charging or discharging operation, whereby the voltage of the capacitor 6 is maintained at the minimum storage voltage that depends upon the temperature associated with the capacitor 6.

As described above, the control apparatus of the present embodiment operates to maintain the minimum storage voltage of the capacitor 6 at a higher voltage when the temperature is relatively low, than the minimum storage voltage set when the temperature is relatively high, so that the minimum storage voltage is controlled according to the temperature characteristic of the capacitor 6. When the starter motor 4 is driven by using the capacitor 6 as a power source to start the engine 1, a sufficiently large quantity of electric power can be supplied to the starter motor 4, to ensure that the starter motor 4 generates sufficiently large torque. Accordingly, the engine 1 can be started without a delay, or an otherwise possible failure to start the engine 1 can be avoided.

In the above-described embodiment, when the voltage of the capacitor 6 is higher than the minimum storage voltage, electric power is supplied from the capacitor 6 to the battery 9 so as to charge the battery 9, whereby a loss of electric power due to self-discharge of the capacitor 6 can be prevented or suppressed, and the alternator 8 is less likely to be driven by the engine 1, which leads to improved fuel economy.

While the exemplary embodiment of the invention has been described as described above, it is to be understood that the invention is not limited to details of the exemplary embodiment, but may be otherwise embodied. For example, the control apparatus for the energy storage device according to the invention may be employed not only in the eco-run vehicle adapted to automatically stop and restart the engine as in the illustrated embodiment, but also in a hybrid vehicle using the engine and a motor/generator as driving power sources. In this case, the engine may be started with electric power supplied from an energy storage device to the motor/generator, or the energy storage device may be discharged so that the vehicle can be started by the motor/generator. Furthermore, the electrical device to which electric power is discharged from the energy storage device is not limited to an electric motor, such as a starter motor, but may be suitably selected from other electrical devices. Moreover, the minimum storage voltage of the energy storage device according to the invention need not linearly change with the temperature, as shown in FIG. 2, but may be at a constant value within a certain temperature range, and change in steps for each temperature range.

It is also to be understood that the invention may be embodied with various other changes, modifications or improvements, without departing from the scope of the invention.

What is claimed is:

1. A control apparatus for use in a vehicle for controlling a first energy storage device adapted to selectively discharge electric power to (a) an electrical device adapted to be driven with the electric power, and (b) a second energy storage device, comprising:

a temperature sensor that measures a temperature associated with the first energy storage device; and a voltage control unit that sets a minimum storage voltage of the first energy storage device to a first voltage level when the temperature measured by the temperature sensor is lower than a predetermined temperature, the first voltage level being higher than a second voltage level to which the minimum storage voltage is set when the temperature is higher than the predetermined temperature, wherein the voltage control unit controls the quantity of electric power discharged from the first energy storage device to the second energy storage device so as to control a remaining voltage of the first energy storage device to at least the minimum storage voltage so that sufficient voltage is available to drive the electrical device.

2. The control apparatus according to claim 1, wherein:

the first energy storage device is operable to store electric power in the form of static electricity, and the second energy storage device is operable to store electric power in the form of chemical energy; and the minimum storage voltage of the first energy storage device is higher than a storage voltage of the second energy storage device.

3. The control apparatus according to claim 1, wherein the electrical device comprises a starter motor that is operable to rotate an internal combustion engine installed on the vehicle.

4. The control apparatus according to claim 1, wherein the vehicle further includes a regenerating unit that recovers electric power by converting kinetic energy of the vehicle into electric energy, and charges the first energy storage device with the recovered electric power.

5. A system for use in a vehicle, comprising:

a first energy storage device adapted to selectively discharge electric power to (a) an electrical device adapted to be driven with the electric power, and (b) a second energy storage device;

a temperature storage that measures a temperature associated with the first energy storage device; and a voltage control unit that sets a minimum storage voltage of the first energy storage device to a first voltage level when the temperature measured by the temperature sensor is lower than a predetermined temperature, the first voltage level being higher than a second voltage level to which the minimum storage voltage is set when the temperature is higher than the predetermined temperature, wherein the voltage control unit controls the quantity of electric power discharged from the first energy storage device to the second energy storage device so as to control a remaining voltage of the first energy storage device to at least the minimum storage voltage so that sufficient voltage is available to drive the electrical device.

6. The system according to claim 5, wherein:

the first energy storage device is operable to store electric power in the form of static electricity, and the second energy storage device is operable to store electric power in the form of chemical energy; and the minimum storage voltage of the first energy storage device is higher than a storage voltage of the second energy storage device.

7. The system according to claim 5, wherein the electrical device comprises a starter motor that is operable to rotate an internal combustion engine installed on the vehicle.

8. The system according to claim 5, further comprising a regenerating unit that recovers electric power by converting kinetic energy of the vehicle into electric energy, and charges the first energy storage device with the recovered electric power.

9. A method of controlling an energy storage device adapted to selectively discharge electric power that (a) an electrical device adapted to be driven with the electric power; and (b) a second energy storage device in a vehicle, comprising the steps of:

sensing a temperature associated with the energy storage device; and setting a minimum storage voltage of the first energy storage device to a first voltage level when the temperature measured is lower than a predetermined temperature, the first voltage level being higher than a second voltage level to which the minimum storage voltage is set when the temperature is higher than the predetermined temperature, wherein the voltage control unit controls the quantity of electric power discharged from the first energy storage device to the second energy storage device so as to control a remaining voltage of the first energy storage device to at least the minimum storage voltage so that sufficient voltage is available to drive the electrical device.

10. The method according to claim 9, wherein:

the first energy storage device is operable to store electric power in the form of static electricity, and the second energy storage device is operable to store electric power in the form of chemical energy; and the minimum storage voltage of the first energy storage device is higher than a storage voltage of the second energy storage device.

11. The method according to claim 9, wherein the electrical device comprises a starter motor that is operable to rotate an internal combustion engine installed on the vehicle.

12. The method according to claim 9, wherein a regenerating unit recovers electric power by converting kinetic energy of the vehicle into electric energy, and charges the first energy storage device with the recovered electric power.

13. A control apparatus for use in a vehicle for controlling an energy storage device adapted to discharge electric power that varies with a temperature, comprising:

a temperature sensor that measures a temperature associated with the energy storage device;

a voltage control unit that sets a minimum storage voltage of the energy storage device to a first voltage level when the temperature measured by the temperature sensor is lower than a predetermined temperature, the first voltage level being higher than a second voltage level to which the minimum storage voltage is set when the temperature is higher than the predetermined temperature;

the vehicle includes an electrical device adapted to be driven with electric power supplied from the energy storage device;

the voltage control unit sets the minimum storage voltage of the energy storage device to the first voltage level higher than the second voltage level, when the temperature measured before the electrical device is actuated is lower than the predetermined temperature;

the vehicle further includes another energy storage device adapted to be charged when selectively receiving electric power from the energy storage device;

the energy storage device is operable to store electric power in the form of static electricity, and the another energy storage device is operable to store electric power in the form of chemical energy; and the minimum storage voltage of the energy storage device is higher than a storage voltage of the another energy storage device.

14. The control apparatus according to claim 13, wherein the vehicle further includes a regenerating unit that recovers electric power by converting kinetic energy of the vehicle into electric energy, and charges the energy storage device with the recovered electric power.

15. A control apparatus for use in a vehicle for controlling an energy storage device adapted to discharge electric power that varies with a temperature, comprising:

a temperature sensor that measures a temperature associated with the energy storage device;

a voltage control unit that sets a minimum storage voltage of the energy storage device to a first voltage level when the temperature measured by the temperature sensor is lower than a predetermined temperature, the first voltage level being higher than a second voltage level to which the minimum storage voltage is set when the temperature is higher than the predetermined temperature;

the vehicle includes an electrical device adapted to be driven with electric power supplied from the energy storage device;

the voltage control unit sets the minimum storage voltage of the energy storage device to the first voltage level higher than the second voltage level, when the temperature measured before the electrical device is actuated is lower than the predetermined temperature;

the electrical device comprises a starter motor that is operable to rotate an internal combustion engine installed on the vehicle;

the vehicle further includes another energy storage device adapted to be charged when selectively receiving electric power from the energy storage device;

the energy storage device is operable to store electric power in the form of static electricity, and the another energy storage device is operable to store electric power in the form of chemical energy; and the minimum storage voltage of the energy storage device is higher than a storage voltage of the another energy storage device.

16. The control apparatus according to claim 15, wherein the vehicle further includes a regenerating unit that recovers electric power by converting kinetic energy of the vehicle into electric energy, and charges the energy storage device with the recovered electric power.

17. A control apparatus for use in a vehicle for controlling an energy storage device adapted to discharge electric power that varies with a temperature, comprising:

a temperature sensor that measures a temperature associated with the energy storage device;

a voltage control unit that sets a minimum storage voltage of the energy storage device to a first voltage level when the temperature measured by the temperature sensor is lower than a predetermined temperature, the first voltage level being higher than a second voltage level to which the minimum storage voltage is set when the temperature is higher than the predetermined temperature;

the vehicle further includes another energy storage device adapted to be charged when selectively receiving electric power from the energy storage device; and the voltage control unit controls a quantity of electric power discharged from the energy storage device to the another storage device so as to control a voltage of the energy storage device to the minimum storage voltage.

18. The control apparatus according to claim 17, wherein the vehicle further includes a regenerating unit that recovers electric power by converting kinetic energy of the vehicle into electric energy, and charges the energy storage device with the recovered electric power.

19. A system for use in a vehicle, comprising:

an energy storage device adapted to discharge electric power that varies with a temperature;

a temperature sensor that measures a temperature associated with the energy storage device;

a voltage control unit that sets a minimum storage voltage of the energy storage device to a first voltage level when the temperature measured by the temperature sensor is lower than a predetermined temperature, the first voltage level being higher than a second voltage level to which the minimum storage voltage is set when the temperature is higher than the predetermined temperature;

an electrical device adapted to be driven with electric power supplied from the energy storage device, wherein the voltage control unit sets the minimum storage voltage of the energy storage device to the first voltage level higher than the second voltage level, when the temperature measured before the electrical device is actuated is lower than the predetermined temperature;

another energy storage device adapted to be charged when selectively receiving electric power from the energy storage device;

the energy storage device is operable to store electric power in the form of static electricity, and the another energy storage device is operable to store electric power in the form of chemical energy; and the minimum storage voltage of the energy storage device is higher than a storage voltage of the another energy storage device.

20. The system according to claim 19, further comprising a regenerating unit that recovers electric power by converting kinetic energy of the vehicle into electric energy, and charges the energy storage device with the recovered electric power.

21. A system for use in a vehicle, comprising:

an energy storage device adapted to discharge electric power that varies with a temperature;

a temperature sensor that measures a temperature associated with the energy storage device;

a voltage control unit that sets a minimum storage voltage of the energy storage device to a first voltage level when the temperature measured by the temperature sensor is lower than a predetermined temperature, the first voltage level being higher than a second voltage level to which the minimum storage voltage is set when the temperature is higher than the predetermined temperature;

an electrical device adapted to be driven with electric power supplied from the energy storage device, wherein the voltage control unit sets the minimum storage voltage of the energy storage device to the first voltage level higher than the second voltage level, when the temperature measured before the electrical device is actuated is lower than the predetermined temperature;

the electrical device comprises a starter motor that is operable to rotate an internal combustion engine installed on the vehicle;

another energy storage device adapted to be charged when selectively receiving electric power from the energy storage device;

the energy storage device is operable to store electric power in the form of static electricity, and the another energy storage device is operable to store electric power in the form of chemical energy; and the minimum storage voltage of the energy storage device is higher than a storage voltage of the another energy storage device.

22. The system according to claim 21, further comprising a regenerating unit that recovers electric power by converting kinetic energy of the vehicle into electric energy, and charges the energy storage device with the recovered electric power.

23. A system for use in a vehicle, comprising:

an energy storage device adapted to discharge electric power that varies with a temperature;

a temperature sensor that measures a temperature associated with the energy storage device;

a voltage control unit that sets a minimum storage voltage of the energy storage device to a first voltage level when the temperature measured by the temperature sensor is lower than a predetermined temperature, the first voltage level being higher than a second voltage level to which the minimum storage voltage is set when the temperature is higher than the predetermined temperature; and another energy storage device adapted to be charged when selectively receiving electric power from the energy storage device, wherein the voltage control unit controls a quantity of electric power discharged from the energy storage device to the another storage device so as to control a voltage of the energy storage device to the minimum storage voltage.

24. The system according to claim 23, further comprising a regenerating unit that recovers electric power by converting kinetic energy of the vehicle into electric energy, and charges the energy storage device with the recovered electric power.

25. A method of controlling an energy storage device adapted to discharge electric power that varies with a temperature in a vehicle, comprising the steps of:

sensing a temperature associated with the energy storage device; and setting a minimum storage voltage of the energy storage device to a first voltage level when the temperature measured is lower than a predetermined temperature, the first voltage level being higher than a second voltage level to which the minimum storage voltage is set when the temperature is higher than the predetermined temperature, wherein the vehicle includes an electrical device adapted to be driven with electric power supplied from the energy storage device;

the minimum storage voltage of the energy storage device is set to the first voltage level higher than the second voltage level, when the temperature measured before the electrical device is actuated is lower than the predetermined temperature;

the vehicle further includes another energy storage device adapted to be charged when selectively receiving electric power from the energy storage device;

the energy storage device is operable to store electric power in the form of static electricity, and the another energy storage device is operable to store electric power in the form of chemical energy; and the minimum storage voltage of the energy storage device is higher than a storage voltage of the another energy storage device.

26. A method of controlling an energy storage device adapted to discharge electric power that varies with a temperature in a vehicle, comprising the steps of:

sensing a temperature associated with the energy storage device;

setting a minimum storage voltage of the energy storage device to a first voltage level when the temperature measured is lower than a predetermined temperature, the first voltage level being higher than a second voltage level to which the minimum storage voltage is set when the temperature is higher than the predetermined temperature;

the vehicle further includes another energy storage device adapted to be charged when selectively receiving electric power from the energy storage device;

the energy storage device is operable to store electric power in the form of static electricity, and the another energy storage device is operable to store electric power in the form of chemical energy; and the minimum storage voltage of the energy storage device is higher than a storage voltage of the another energy storage device.

27. A method of controlling an energy storage device adapted to discharge electric power that varies with a temperature in a vehicle, comprising the steps of:

sensing a temperature associated with the energy storage device; and setting a minimum storage voltage of the energy storage device to a first voltage level when the temperature measured is lower than a predetermined temperature, the first voltage level being higher than a second voltage level to which the minimum storage voltage is set when the temperature is higher than the predetermined temperature;

the vehicle further includes another energy storage device adapted to be charged when selectively receiving electric power from the energy storage device; and a quantity of electric power discharged from the energy storage device to the another storage device is controlled so as to control a voltage of the energy storage device to the minimum storage voltage.

* * * * *